(12) United States Patent
Andersen et al.

(10) Patent No.: US 10,785,294 B1
(45) Date of Patent: Sep. 22, 2020

(54) METHODS, SYSTEMS, AND COMPUTER READABLE MEDIUMS FOR MANAGING FAULT TOLERANCE OF HARDWARE STORAGE NODES

(71) Applicant: VCE Company, LLC, Richardson, TX (US)

(72) Inventors: Ryan Joseph Andersen, Belmont, MA (US); Donald Edward Norbeck, Jr., Lafayette Hill, PA (US); Jonathan Peter Streete, San Jose, CA (US); Seamus Patrick Kerrigan, Ballincollig (IE)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 451 days.

(21) Appl. No.: 14/813,516

(22) Filed: Jul. 30, 2015

(51) Int. Cl.
*H04L 29/08* (2006.01)
*G06F 3/06* (2006.01)

(52) U.S. Cl.
CPC .......... *H04L 67/1095* (2013.01); *G06F 3/065* (2013.01); *G06F 3/0619* (2013.01); *G06F 3/0683* (2013.01); *H04L 67/1097* (2013.01)

(58) Field of Classification Search
CPC . H04L 67/1097; H04L 67/1095; H04L 67/10; H04L 67/32; H04L 12/437; H04L 45/02; H04L 69/40; G06F 3/0614; G06F 3/0619; G06F 3/065; G06F 3/0683; G06F 3/0629; G06F 3/067; G06F 11/0724; G06F 11/0727; G06F 11/0766; G06F 11/201; G06F 11/2025; G06F 11/2089;
(Continued)

(56) References Cited

U.S. PATENT DOCUMENTS

2002/0188711 A1* 12/2002 Meyer .................. G06F 3/0605
709/223
2010/0106906 A1* 4/2010 Galloway .......... G06F 11/1076
711/114
(Continued)

OTHER PUBLICATIONS

Dell Inc., "Dell Engineered Solutions for VMware EVO: RAIL", Solution Brief, 2014.*
(Continued)

*Primary Examiner* — Dhairya A Patel
*Assistant Examiner* — Sandarva Khanal
(74) *Attorney, Agent, or Firm* — Jenkins, Wilson, Taylor & Hunt, P.A.

(57) ABSTRACT

Methods, systems, and computer readable mediums for managing fault tolerance. A method includes receiving a request to establish a pool of data storage for an application of a distributed computing system. The distributed computing system includes hardware storage nodes integrated with compute nodes. The method includes receiving a target level of fault tolerance for the pool of data storage. The method includes establishing the pool of data storage by specifying, for each hardware storage node, a mirror hardware storage node for mirroring data stored on the hardware storage node so that the hardware storage node and the mirror hardware storage node do not share one or more pieces of physical equipment as specified in a physical layout of the hardware storage nodes to meet the target level of fault tolerance.

3 Claims, 5 Drawing Sheets

(58) Field of Classification Search
CPC ............ G06F 11/2094; G06F 11/1456; G06F 2201/815; G06F 9/45558
See application file for complete search history.

(56) References Cited

U.S. PATENT DOCUMENTS

| | | | | |
|---|---|---|---|---|
| 2012/0005344 A1* | 1/2012 | Kolin | ................. | H05K 7/20836 709/226 |
| 2012/0130950 A1* | 5/2012 | Jain | ................... | G06F 17/30212 707/634 |
| 2013/0346532 A1* | 12/2013 | D'Amato | .............. | G06F 3/0617 709/213 |
| 2014/0006672 A1* | 1/2014 | Das | ...................... | H05K 7/1498 710/305 |
| 2014/0059310 A1* | 2/2014 | Du | .......................... | G06F 3/065 711/162 |
| 2014/0164581 A1* | 6/2014 | Park | .................... | G06F 11/3433 709/221 |
| 2015/0100826 A1* | 4/2015 | Vujic | ................... | G06F 11/301 714/37 |
| 2015/0178019 A1* | 6/2015 | Hegdal | ................. | G06F 3/0664 711/170 |
| 2015/0186162 A1* | 7/2015 | Van Der Walt | ....... | G06F 3/0481 718/1 |
| 2015/0347245 A1* | 12/2015 | Andre | ................... | G06F 11/203 714/6.3 |

OTHER PUBLICATIONS

VMware Inc., "Introduction to VMware EVO: RAIL", White Paper, Aug. 2014.*
Roth, et al., ESG Lab, "Nutanix Complete Cluster", May 2012.*

* cited by examiner

METHODS, SYSTEMS, AND COMPUTER READABLE MEDIUMS FOR MANAGING FAULT TOLERANCE OF HARDWARE STORAGE NODES

TECHNICAL FIELD

This specification relates generally to managing fault tolerance, e.g., by configuring and auditing fault tolerance of hardware storage nodes in a distributed computing system.

BACKGROUND

In some conventional computer systems, hardware storage nodes are physically grouped together within the computer system to create a centralized pool of storage. Storage management software can use the hardware storage nodes by partitioning the centralized pool into application-level pools and presenting those pools to servers in the computer system so that each pool appears to be a single logical volume, even though the pool itself may be physically implemented using various hardware storage nodes. In a hyper-converged system, a computer system can include some number of homogenous computing devices, e.g., servers with processors, storage, and networking capability. Hardware storage nodes can be integrated with the homogenous computing devices and therefore distributed throughout the computer system. Hyper-convergence management software can create virtual pools of storage to present to servers using the distributed hardware storage nodes, but since the hyper-convergence management software lacks data indicating the physical locations of the hardware storage nodes, the hyper-convergence management software cannot configure and audit pools of storage for fault tolerance based on the physical locations of the hardware storage nodes.

SUMMARY

This specification describes methods, systems, and computer readable mediums for managing fault tolerance. In some examples, a method includes receiving a request to establish a pool of data storage for an application of a distributed computing system. The distributed computing system includes hardware storage nodes integrated with compute nodes. The method includes receiving a target level of fault tolerance for the pool of data storage. The method includes establishing the pool of data storage by specifying, for each hardware storage node, a mirror hardware storage node for mirroring data stored on the hardware storage node so that the hardware storage node and the mirror hardware storage node do not share one or more pieces of physical equipment as specified in a physical layout of the hardware storage nodes to meet the target level of fault tolerance.

DETAILED DESCRIPTION

Conventional hyper-converged systems lack the capability of tracking the physical layout of hardware storage nodes. System operators can manually track physical locations and then painstakingly configure each individual hardware storage node for a target level of fault tolerance. For example, conventional hyper-converged systems provide mirroring, so that data written to one hardware storage node is automatically written to another hardware storage node, but fault tolerance is managed manually, a single node at a time. Moreover, auditing fault tolerance levels can be a labor-intensive task as each setting is usually pulled and compared to a physical deployment schema. As deployments get larger and systems are replaced or upgraded, the complexity to both maintain and audit fault tolerance can grow exponentially.

The systems, methods, and computer readable mediums described in this specification can be used to detect whether storage in a distributed computing system, e.g., hyper-converged system, is subject to a single point of failure. For example, a system can detect whether the loss of power to a two rack unit (RU) chassis in an equipment rack containing hyper-converged system nodes could render the storage component contained in that two RU chassis unavailable. The system can also be configured to detect whether the loss of an entire rack of equipment would result in the storage in that rack being inaccessible.

The systems, methods, and computer readable mediums described in this specification can be used to configure hyper-converged storage to meet a target level of fault tolerance. For example, if a system operator determines that a particular hyper-converged data storage volume is critical, the operator could request from the system that the volume be configured such that if an entire equipment rack were to fail, the data stored on that volume would still be available.

The systems, methods, and computer readable mediums described in this specification can be used in various types of fault domains that are based on a physical layout of equipment, e.g., rack level, chassis level, power supply level, network equipment level, and so on. For example, a fault domain can be a power distribution unit (PDU), a network switch, or a router. This specification describes the systems, methods, and computer readable mediums with respect to an example hyper-converged system, but the systems, methods, and computer readable mediums may also be used, more generally, with any appropriate distributed storage system having hardware storage nodes integrated with compute nodes.

Figure 1:
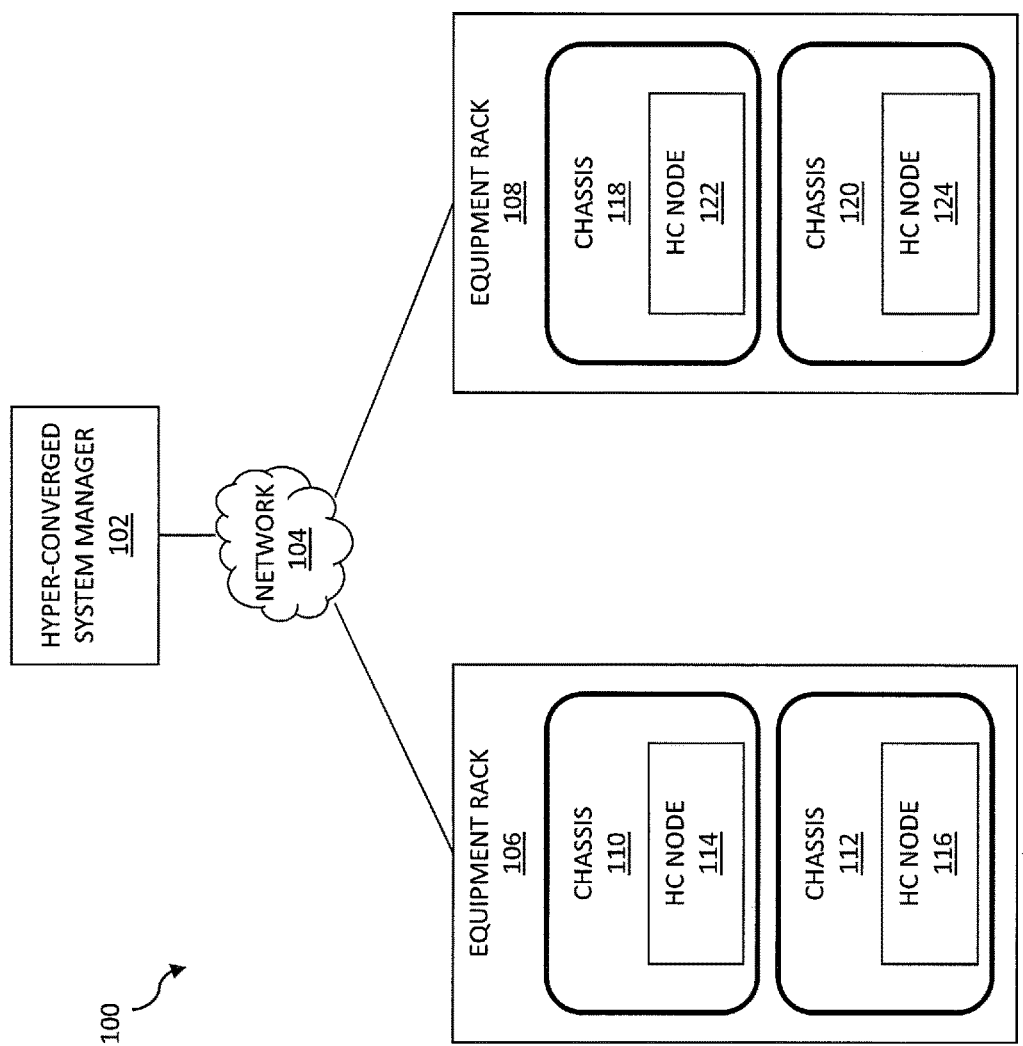
FIG. 1 is a block diagram of an example hyper-converged system.

FIG. 1 is a block diagram of an example hyper-converged system 100. System 100 includes a hyper-converged system manager 102, a data communications network 104, and a number of equipment racks 106, 108. Equipment rack 106 includes a number of chassis 110, 112, and each chassis includes a hyper-converged node 114, 116. Similarly, equipment rack 108 includes a number of chassis 118, 120, and each chassis includes a hyper-converged node 122, 124. A hyper-converged system is a distributed computing system implemented using a number of hyper-converged nodes and possibly other types of computing nodes.

Hyper-converged nodes 114, 116, 122, and 124 are computer systems that include physical components for data processing, data storage, and data communication. For example, a hyper-converged node can be one or more hardware storage nodes integrated with a compute node. Hardware storage nodes can be integrated with compute nodes to create a distributed storage system, for example, by virtue of software that implements the storage application executing on the same one or more processors that run distributed computing applications. In some examples, hyper-converged system 100 includes hardware storage nodes that are not integrated with compute nodes, in addition to hyper-converged nodes 114, 116, 122, and 124.

Hyper-converged system manager 102 is a computer system comprising one or more computers configured, by virtue of appropriate programming, to perform virtualization using hyper-converged nodes 114, 116, 122, and 124. Performing virtualization can include abstracting software and/or hardware components and presenting the abstraction as a new logical entity. For example, hyper-converged system manager 102 can be configured to distribute various computing tasks across hyper-converged nodes 114, 116, 122, and 124.

Hyper-converged system manager 102 is configured to store data across hyper-converged nodes 114, 116, 122, and 124. Hyper-converged system manager 102 can establish pools of data storage using hardware storage nodes in hyper-converged nodes 114, 116, 122, and 124 and present a pool of data storage to an application executing in system 100 as a single logical storage volume. Hyper-converged system manager 102 can be configured to mirror data across hardware storage nodes. For example, hyper-converged system manager 102 can be configured so that, when an application writes to a pool of data storage, data that is written to particular hardware storage node is also written to an assigned mirror storage node.

Hyper-converged system manager 102 is configured to establish pools of data storage that meet target levels of fault tolerance. Hyper-converged system manager 102 specifies, for each hardware storage node of a pool of data storage, a mirror hardware storage node so that the hardware storage node and the mirror hardware storage node do not share one or more pieces of physical equipment as specified in a physical layout of the hardware storage nodes.

For example, suppose that each of hyper-converged nodes 114, 116, 122, and 124 executes software that stores a rack and/or chassis identifier for the rack and chassis housing the hyper-converged nodes. Hyper-converged system manager 102 can query hyper-converged nodes 114, 116, 122, and 124 for the rack and/or chassis identifiers, which collectively can be used as a physical layout of the hardware storage nodes. The rack and chassis identifiers can be unique identifiers to identify components and relationships between components. Software executing on hyper-converged nodes 114, 116, 122, and 124 that is aware of the physical layout of the system can assign the rack and chassis identifiers.

Hyper-converged system manager 102 can then specify a mirror hardware storage node for each hardware storage node by finding, for each hardware storage node, an unallocated hardware storage node having a rack identifier different from the rack identifier of the hardware storage node to achieve rack-level fault tolerance for the pool of data storage. Similarly, hyper-converged system manager 102 can specify a mirror hardware storage node for each hardware storage node by finding, for each hardware storage node, an unallocated hardware storage node having a chassis identifier different from the chassis identifier of the hardware storage node to achieve chassis-level fault tolerance for the pool of data storage.

Although FIG. 1 illustrates an example hyper-converged system, the systems, methods, and computer readable mediums described in this specification can be used in any appropriate distributed computing system. In general, an appropriate distributed computing system implements a distributed data storage system that includes distributed hardware storage nodes managed by a distributed storage manager.

Figure 2:
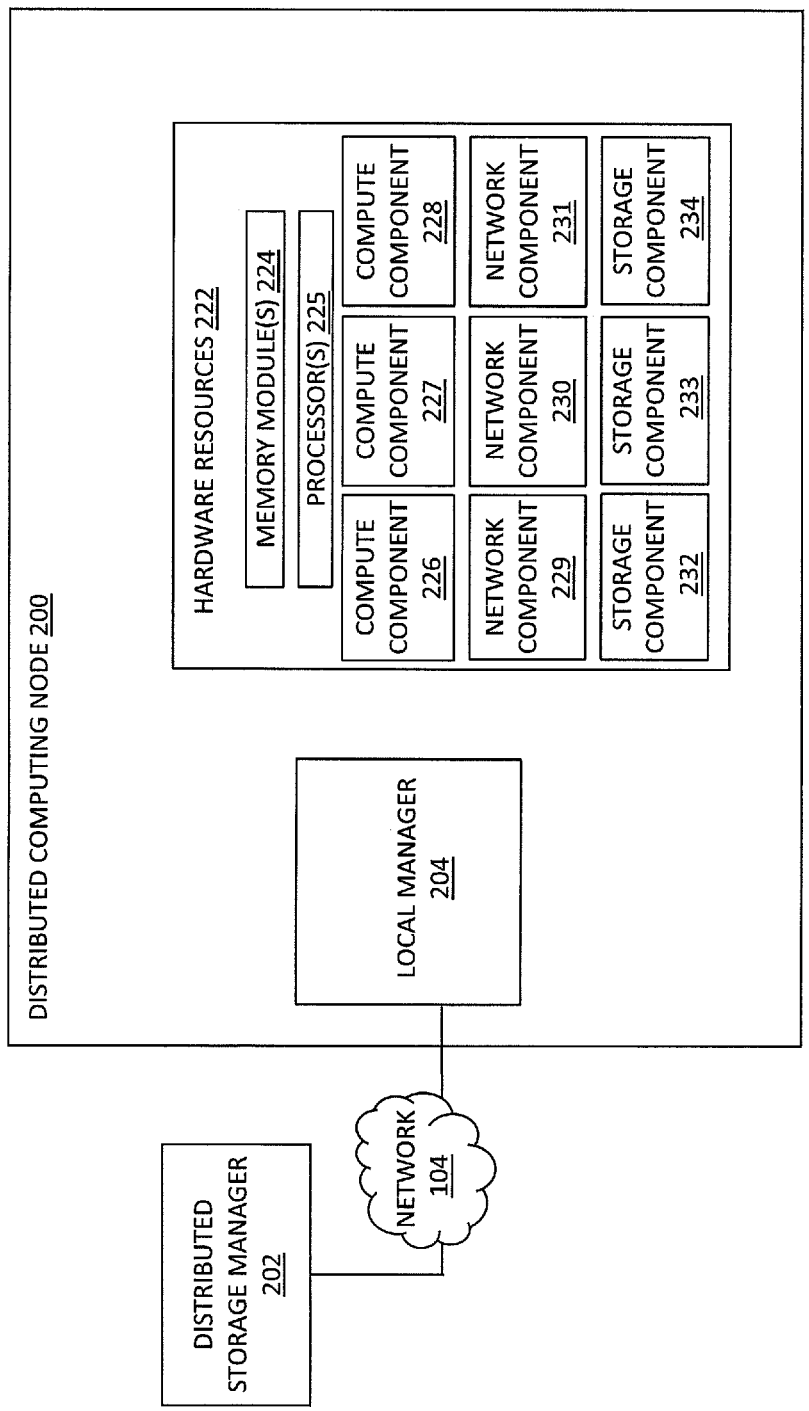
FIG. 2 is a block diagram of an example distributed computing node.

FIG. 2 is a block diagram of an example distributed computing node 200. Distributed computing node 200 can be used to implement one or more or all of the hyper-converged nodes of FIG. 1.

Distributed computing node 200 can be managed jointly by a remote distributed storage manager 202 and a local manager 204. The distributed storage manager 202 can be, e.g., the hyper-converged system manager 102 of FIG. 1, which can be configured to manage distributed storage across various distributed storage nodes. Local manager 204 can be any suitable entity for managing aspects of distributed computing node 200. For example, local manager 204 can be configured to manage performance, resource utilization levels, and other aspects associated with a virtualized infrastructure and/or a physical infrastructure.

Distributed computing node 200 can be configured, by virtue of appropriate programming, to provide data management functionality, cloud service functionality, and/or other functionality. Distributed computing node 200 can be configured for communicating with other distributed computing nodes (e.g., located at various physical locations or sites) and can communicate with various other entities, such as network nodes (e.g., servers hosting online sites) and users. For example, distributed computing node 200 can communicate with an entity (e.g., software executing on a processor, a web-based interface, etc.) for allowing a user (e.g., a human operator or an automated system) to interact with distributed computing node 200. In some examples, distributed computing node 200 communicates with a user device, e.g., a portable computer or tablet computer, for managing distributed computing node 200.

Local manager 204 can interact with one or more management applications. For example, distributed storage manager 202 can send a request to local manager 204 for physical layout information. Local manager 204 can store data such as a rack identifier specifying an equipment rack housing physical infrastructure of distributed computing node 200 and/or a chassis identifier specifying a chassis within an equipment rack housing physical infrastructure of distributed computing node 200. Local manger 204 can return some or all of this data in response to the request from distributed storage manager 202.

Distributed computing node 200 includes hardware resources 222, such as memory module(s) 224, processor(s) 225, compute components 226-228, network components 229-231, and storage components 232-234. Hardware resources 222 can be communicatively connected to various other components of distributed computing node 200. Hardware resources 222 can be configured for use by one or more virtual entities. Network components 229-231 (e.g., network switches or storage area network (SAN) switches) can be configured to enable communication between the components in distributed computing node 200.

In some examples, local manager 204 is configured to provision hardware resources 222 via one or more communications interfaces. For example, local manager 204 can provision hardware resources 222 for implementing one or more virtual entities. In some examples, local manager 204 can be a management component or entity, such as a unified infrastructure manager (UIM) or a unified computing system (UCS) director entity, which is configured to provision the physical hardware of distributed computing node 200.

Processor(s) 225 can include a microprocessor (e.g., a trusted platform module (TPM) using trusted execution technology (TXT)), central processing unit (CPU), or any other like hardware based processing unit. In some examples, aspects of the distributed computing node 200 can be stored in memory module(s) 224, which can include random access memory (RAM), read only memory (ROM), optical read/write memory, cache memory, magnetic read/write memory, flash memory, or any other non-transitory computer readable medium.

In some examples, processor(s) 225 and memory module(s) 224 can be used to execute, implement, and/or manage the operation of some aspects of distributed computing node 200. In some examples, each of storage components 232-234 can include any storage medium or storage unit that is configured to store information accessible by processor(s) 225 via a system bus. Storage components 232-234 can include or be integrated with hardware storage nodes, e.g., hard disk drives or solid state drives. One or more of compute components 226-228 can be used to execute both storage management software and application software, so that storage components 232-234 are integrated with compute components 226-228.

The various entities depicted in FIG. 2 can be incorporated or implemented using one or more other entities depicted in FIG. 2. For example, memory module(s) 224 and/or processor(s) 225 can be incorporated in compute component 226, compute component 227, compute component 228, and/or a specialized device or compute component. In another example, local manager 204 can be implemented using or located in another device in distributed computing node 200. In some examples, virtualization software and/or virtualized components can be implemented on distributed computing node 200 using another compute device (e.g., a blade appliance designated for some system management software).

Figure 3:
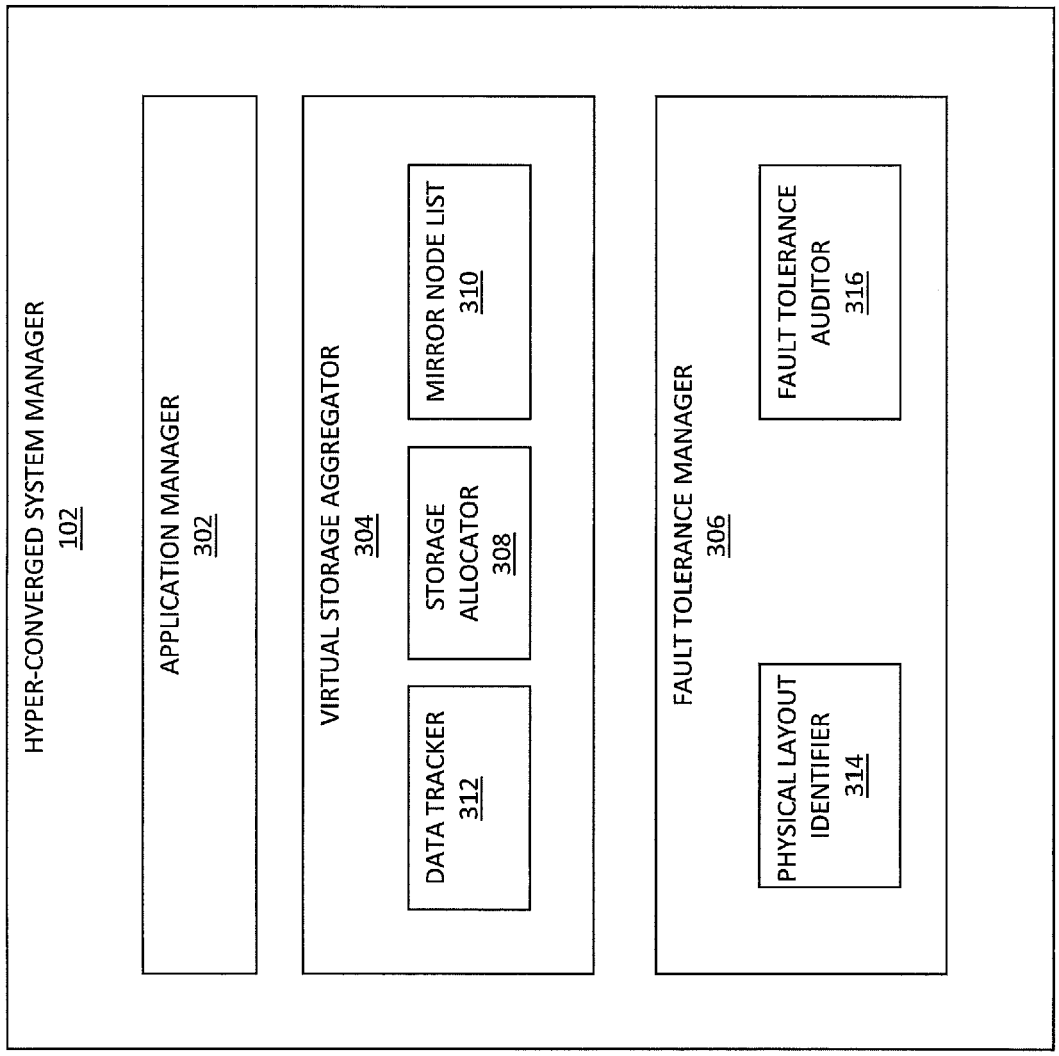
FIG. 3 is a block diagram of an example hyper-converged system manager.

FIG. 3 is a block diagram of an example hyper-converged system manager 102. System manager 102 can be implemented on a system of one or more computers, and system manager 102 can be housed in an equipment rack of a hyper-converged system, e.g., one of equipment racks 106 and 108 as shown in FIG. 1.

System manager 102 includes an application manager 302, a virtual storage aggregator 304, and a fault tolerance manager 306. Application manager 302, virtual storage aggregator 304, and fault tolerance manager 306 are stored in memory. For example, application manager 302, virtual storage aggregator 304, and fault tolerance manager 306 can be stored on one or more computer readable mediums and loaded into memory for execution. Virtual storage aggregator 304 includes a data tracker 312, a storage allocator 308, and a mirror node list 310. Fault tolerance manager 306 includes a physical layout identifier 314 and a fault tolerance auditor 316.

Application manager 302 is configured to launch and manage execution of applications within the hyper-converged system. For example, application manager 302 can distribute computing tasks across compute components distributed throughout the hyper-converged system.

Virtual storage aggregator 304 is configured to establish pools of data storage using hardware storage nodes distributed throughout the hyper-converged system. Virtual storage aggregator 304 can present a pool of storage to an application so that it appears as a single logical volume. Then the application can read and write data to the pool using virtual storage aggregator 304.

Virtual storage aggregator 304 establishes a pool of data storage using storage allocator 308. Storage allocator 308 allocates hardware storage nodes to a pool. Storage allocator 308 has a list of hardware storage nodes in the hyper-converged system, e.g., listed by unique identifiers or network addresses, and storage allocator 308 tracks which hardware storage nodes are allocated and which are unallocated. While establishing a pool of data storage nodes, storage allocator 308 selects unallocated hardware storage nodes from the list, allocates the selected hardware storage nodes to the pool, and then stores data indicating that the allocated hardware storage nodes are now allocated.

Virtual storage aggregator 304 also maintains mirror node list 310. When establishing a pool of data storage, storage allocator 308 allocates hardware storage nodes and mirror hardware storage nodes. Mirror node list 310 indicates allocated hardware storage nodes and, for each allocated hardware storage nodes, a corresponding mirror hardware storage node.

When an application writes data to a pool using virtual storage aggregator 304, virtual storage aggregator 304 writes the data to both a hardware storage node and a corresponding mirror hardware storage node for the hardware storage node. In some examples, virtual storage aggregator 304 can write the data to more than one mirror hardware storage node. In some examples, virtual storage aggregator 304 writes data produced using an error correcting code to the mirror storage node instead of producing an exact copy of the data.

Virtual storage aggregator 304 keeps track of where data is in the pool is stored using data tracker 312. When virtual storage aggregator 304 writes data to a hardware storage node, data tracker 312 stores a record indicating the location of that data, e.g., an identifier for the hardware storage node storing that data. When virtual storage aggregator 304 reads data from the pool, virtual storage aggregator 304 uses data tracker 312 to determine which hardware storage node is storing the data using the stored records.

Fault tolerance manager 306 can be used when establishing or auditing a pool of data storage. For example, storage allocator 308 can use physical layout identifier 314 to find, for an allocated hardware storage node, a corresponding mirror storage node that has a different chassis or rack identifier than the allocated hardware storage node. Storage allocator 308 can search the list of unallocated storage nodes for an appropriate mirror storage node that has a different chassis or rack identifier using any appropriate search algorithm.

Physical layout identifier 314 is configured to identify a physical layout of the hardware storage nodes of the hyper-converged system. For example, physical layout identifier 314 can query local manager 204 of distributed computing node 200, shown in FIG. 2, for rack and/or chassis identifiers or other information indicating fault domains for the hardware storage nodes, e.g., power supply identifiers for power domains or network identifiers for network domains. In some examples, physical layout identifier 314 can use a database to store data specifying physical layout parameters of the hyper-converged system. Physical layout identifier 314 can alternatively, or additionally, identify the physical layout by one or more of: mapping network switch ports to nodes (e.g., in an environment where a switch is dedicated to a single rack); tracking equipment using radio frequency identifier (RFID) tags attached to physical elements; and 802.11 triangulation.

Fault tolerance auditor 316 is configured to audit an existing pool of data storage for fault tolerance. For example, fault tolerance auditor 316 can receive a list of hardware storage nodes and corresponding mirror hardware storage nodes for the pool. Then, fault tolerance auditor 316 can use physical layout identifier 314 to receive chassis identifiers and/or rack identifiers or any other appropriate physical layout information to determine, for each hardware storage node in the list, whether the hardware storage node shares a piece of physical equipment with the hardware storage node's mirror hardware storage node. Fault tolerance auditor 316 can generate a list of hardware storage nodes that do not meet a specified fault tolerance level, e.g., hardware storage nodes that share a rack and/or chassis identifier with corresponding mirror hardware storage nodes.

Figure 4:
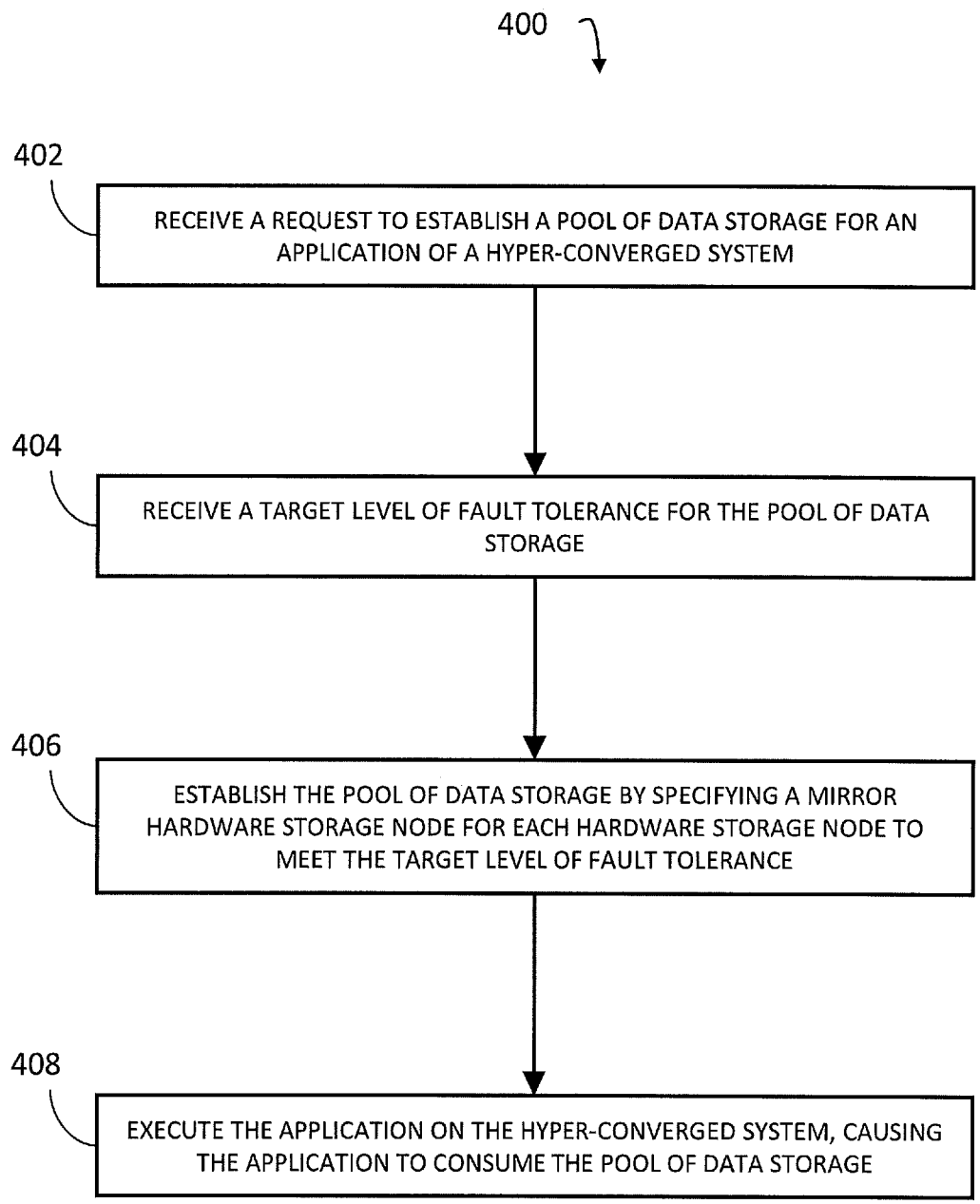
FIG. 4 is a flow diagram of an example method for managing fault tolerance by establishing a pool of storage that meets a target level of fault tolerance.

FIG. 4 is a flow diagram of an example method 400 for managing fault tolerance by establishing a pool of storage that meets a target level of fault tolerance. The hyper-converged system manager 102 as shown in FIG. 1 can perform the method 400. For purposes of illustration, the method 400 will be described with reference to a system manager that performs the method 400.

The system manager receives a request to establish a pool of data storage for an application of a hyper-converged system (block 402). The system manager receives a target level of fault tolerance for the pool of data storage (block 404). The system manager establishes the pool of data storage to meet the target level of fault tolerance (block 406).

For example, the pool of data storage can be specified as requiring a certain total amount of storage. Based on the total amount of storage and the amount of storage available on the hardware storage nodes, the system manager can determine the total number of hardware storage nodes needed to meet the required total amount of storage. The system manager then selects unallocated hardware storage nodes for the pool and, for each selected hardware storage node, finds a mirror storage node that, according to a physical layout, does not share a piece of physical equipment with the hardware storage node to meet the target level of fault tolerance.

When the hardware storage nodes and mirror hardware storage nodes have been allocated, the system manager can execute the application on the hyper-converged system (block 408). The application consumes the pool of data storage by reading and writing to the pool. When the system writes data to the pool, the data is written to a hardware storage node, and the data (or error correcting code based on the data) is written to the mirror hardware storage node for the hardware storage node.

Figure 5:
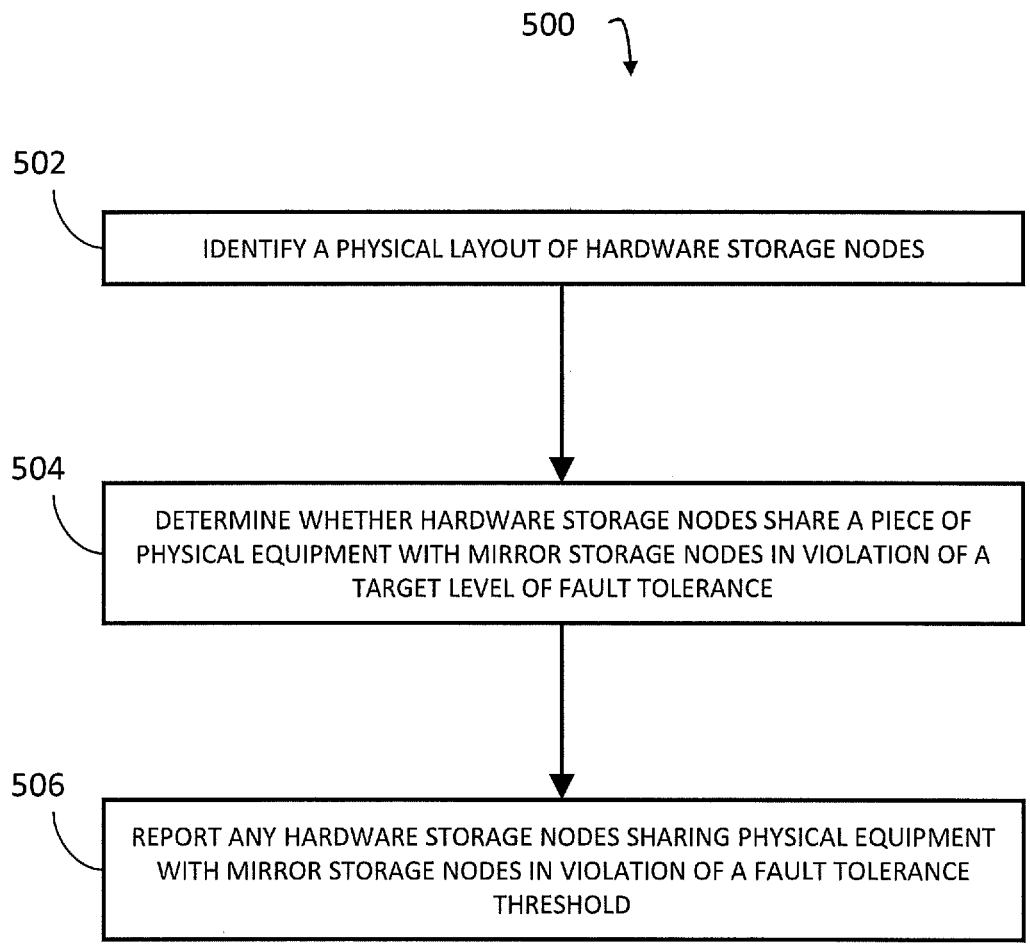
FIG. 5 is a flow diagram of an example method for managing fault tolerance by auditing a pool of storage to determine whether the pool of storage meets a target level of fault tolerance.

FIG. 5 is a flow diagram of an example method 500 for managing fault tolerance by auditing a pool of storage to determine whether the pool of storage meets a target level of fault tolerance. The hyper-converged system manager 102 can perform the method 500. For purposes of illustration, the method 500 will be described with reference to a system manager that performs the method 500.

The system manager identifies a physical layout of hardware storage nodes (block 502). For example, the system manager can query a local manager of a distributed computing node for rack and/or chassis identifiers stored by the local manger. The system manager determines whether any hardware storage node shares a piece of physical equipment with its corresponding mirror storage node in violation of the target level of fault tolerance (block 504).

For example, the system manager can, for each hardware storage node of the pool, compare a rack and/or chassis identifier for the hardware storage node with a corresponding rack and/or chassis identifier for the corresponding mirror hardware storage node. If the two identifiers are identical, then the system manager can determine that two nodes share a piece of physical equipment in violation of a rack and/or chassis level of fault tolerance. The system manager generates a report specifying any hardware storage nodes that are in violation of the target level of fault tolerance (block 506). The results of the audit can be used, e.g., to reallocate a pool of storage to meet the target level of fault tolerance, e.g., as described above with reference to FIG. 4.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for managing fault tolerance, the method comprising:
    receiving, by one or more computers, a request to establish a pool of data storage for an application of a distributed computing system, the distributed computing system comprising a plurality of hardware storage nodes each integrated with a respective compute node, wherein the distributed computing system comprises a hyper-converged system comprising a plurality of hyper-converged nodes, wherein the hyper-converged system is configured to perform virtualization and includes a hyper-converged storage manager configured to present the pool of data storage to the application as a single logical storage volume;
    receiving, by the one or more computers, a target level of fault tolerance for the pool of data storage;
    determining a physical layout of the hardware storage nodes by querying the hyper-converged nodes;
    establishing, by the one or more computers, the pool of data storage by specifying, for each hardware storage node, a mirror hardware storage node for mirroring data stored on the hardware storage node so that the hardware storage node and the mirror hardware storage node do not share one or more pieces of physical equipment as specified in the physical layout of the hardware storage nodes to meet the target level of fault tolerance; and
    auditing the pool of data storage by determining, using the physical layout of the hardware storage nodes, whether any of the hardware storage nodes shares a piece of physical equipment with a mirror hardware storage node in violation of the target level of fault tolerance and generating a list of hardware storage nodes that do not meet the target level of fault tolerance for the pool of data storage;

wherein the distributed computing system comprises a plurality of equipment racks housing the hardware storage nodes in a plurality of chassis, wherein the physical layout of the hardware storage nodes specifies a chassis identifier for each hardware storage node indicating which chassis houses the hardware storage node and a rack identifier for each hardware storage node indicating which equipment rack houses the hardware storage node, and wherein specifying a mirror hardware storage node for each hardware storage node comprises finding, for each hardware storage node, an unallocated hardware storage node having a chassis identifier different from the chassis identifier of the hardware storage node and a rack identifier different from the rack identifier of the hardware storage node, thereby achieving chassis-level and rack-level fault tolerance for the pool of data storage.

2. A system comprising:

one or more physical computers; and a virtual storage aggregator implemented on the one or more physical computers for performing operations comprising:

receiving a request to establish a pool of data storage for an application of a distributed computing system, the distributed computing system comprising a plurality of hardware storage nodes each integrated with a respective compute node, wherein the distributed computing system comprises a hyper-converged system comprising a plurality of hyper-converged nodes, wherein the hyper-converged system is configured to perform virtualization and includes a hyper-converged storage manager configured to present the pool of data storage to the application as a single logical storage volume;

receiving a target level of fault tolerance for the pool of data storage;

determining a physical layout of the hardware storage nodes by querying the hyper-converged nodes;

establishing the pool of data storage by specifying, for each hardware storage node, a mirror hardware storage node for mirroring data stored on the hardware storage node so that the hardware storage node and the mirror hardware storage node do not share one or more pieces of physical equipment as specified in the physical layout of the hardware storage nodes to meet the target level of fault tolerance; and auditing the pool of data storage by determining, using the physical layout of the hardware storage nodes, whether any of the hardware storage nodes shares a piece of physical equipment with a mirror hardware storage node in violation of the target level of fault tolerance and generating a list of hardware storage nodes that do not meet the target level of fault tolerance for the pool of data storage;

wherein the distributed computing system comprises a plurality of equipment racks housing the hardware storage nodes in a plurality of chassis, wherein the physical layout of the hardware storage nodes specifies a chassis identifier for each hardware storage node indicating which chassis houses the hardware storage node and a rack identifier for each hardware storage node indicating which equipment rack houses the hardware storage node, and wherein specifying a mirror hardware storage node for each hardware storage node comprises finding, for each hardware storage node, an unallocated hardware storage node having a chassis identifier different from the chassis identifier of the hardware storage node and a rack identifier different from the rack identifier of the hardware storage node, thereby achieving chassis-level and rack-level fault tolerance for the pool of data storage.

3. A non-transitory computer readable medium having stored thereon executable instructions which, when executed by one or more physical computers, cause the one or more physical computers to perform operations comprising:

receiving a request to establish a pool of data storage for an application of a distributed computing system, the distributed computing system comprising a plurality of hardware storage nodes each integrated with a respective compute node, wherein the distributed computing system comprises a hyper-converged system comprising a plurality of hyper-converged nodes, wherein the hyper-converged system is configured to perform virtualization and includes a hyper-converged storage manager configured to present the pool of data storage to the application as a single logical storage volume;

receiving a target level of fault tolerance for the pool of data storage;

determining a physical layout of the hardware storage nodes by querying the hyper-converged nodes;

establishing the pool of data storage by specifying, for each hardware storage node, a mirror hardware storage node for mirroring data stored on the hardware storage node so that the hardware storage node and the mirror hardware storage node do not share one or more pieces of physical equipment as specified in the physical layout of the hardware storage nodes to meet the target level of fault tolerance; and auditing the pool of data storage by determining, using the physical layout of the hardware storage nodes, whether any of the hardware storage nodes shares a piece of physical equipment with a mirror hardware storage node in violation of the target level of fault tolerance and generating a list of hardware storage nodes that do not meet the target level of fault tolerance for the pool of data storage;

wherein the distributed computing system comprises a plurality of equipment racks housing the hardware storage nodes in a plurality of chassis, wherein the physical layout of the hardware storage nodes specifies a chassis identifier for each hardware storage node indicating which chassis houses the hardware storage node and a rack identifier for each hardware storage node indicating which equipment rack houses the hardware storage node, and wherein specifying a mirror hardware storage node for each hardware storage node comprises finding, for each hardware storage node, an unallocated hardware storage node having a chassis identifier different from the chassis identifier of the hardware storage node and a rack identifier different from the rack identifier of the hardware storage node, thereby achieving chassis-level and rack-level fault tolerance for the pool of data storage.

* * * * *